United States Patent Office 3,210,648
Patented Oct. 5, 1965

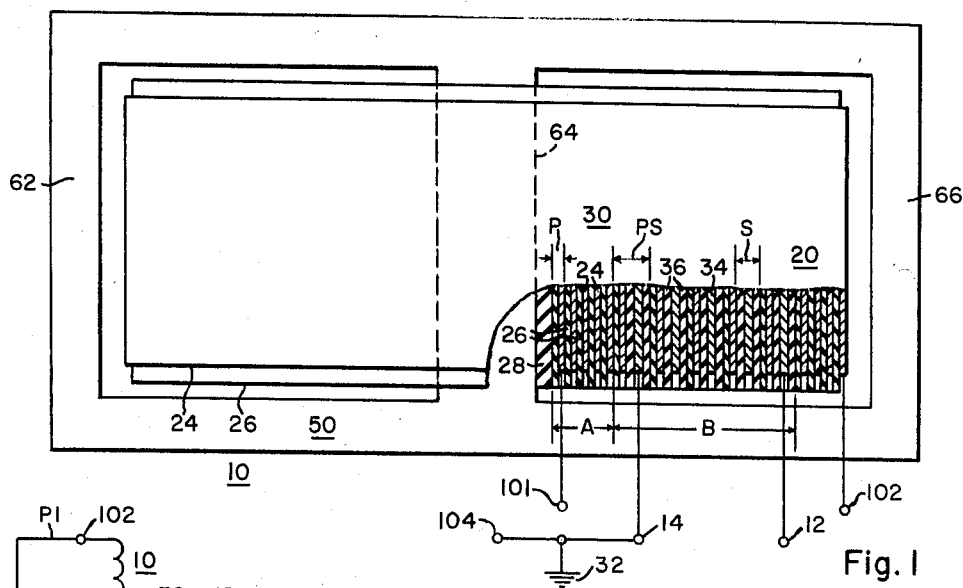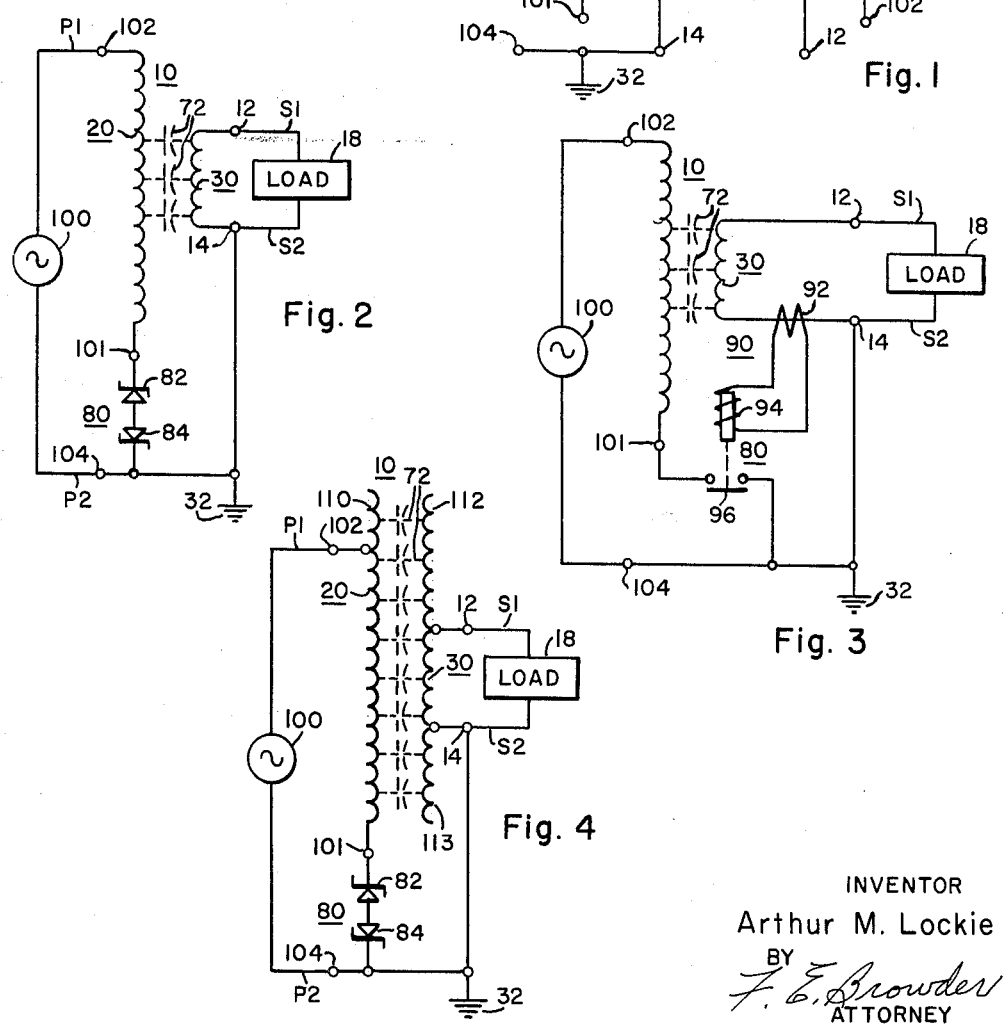

3,210,648
REGULATING AND CURRENT LIMITING
TRANSFORMER SYSTEM
Arthur M. Lockie, Sharon, Pa., assignor to Westinghouse Electric Corporation, East Pittsburgh, Pa., a corporation of Pennsylvania
Filed July 9, 1962, Ser. No. 208,413
18 Claims. (Cl. 323—60)

This invention relates to electrical inductive apparatus, such as transformers, and more particularly to means for protecting such apparatus from damage during certain operating conditions of the apparatus.

This application is a continuation-in-part of application Serial No. 853,936, now abandoned, filed November 18, 1959, and assigned to the same assignee as this application.

An important factor in applying a transformer in an electrical distribution system is the overall impedance of the transformer. In order to improve the voltage regulation in a distribution system and to increase both the efficiency and the useful load-carrying ability of a distribution system, it is desirable that a transformer employed in a distribution system offer a relatively low impedance to the flow of useful load currents during normal operating conditions in the distribution system. On the other hand, when a fault or abnormal operating condition occurs on the secondary circuit connected to a transformer in a distribution system, it is desirable that the transformer present a relatively high impedance to the flow of the abnormally large currents resulting from such a fault condition in order to limit the magnitude of the fault current, as well as the corresponding overvoltages associated therewith. One method of providing a fixed level of leading power factor compensation for the impedance of a transformer to thereby improve the voltage regulation and the efficiency in an electrical distribution system is disclosed in my copending application, Serial No. 745,555, now abandoned, filed June 30, 1958, and assigned to the same assignee as the present application. The latter copending application discloses a winding construction which provides a predetermined capacitance between the adjacent turns of the different windings of an electrical inductive apparatus, such as a transformer. The capacitance provided by the latter construction is effectively connected in parallel or in shunt with one of the windings of a transformer, as disclosed, and may be employed to substantially cancel or compensate for the lagging power factor reactive voltage drop due to the magnetizing component of the exciting current of a transformer which would otherwise be present. The capacitance provided by the construction disclosed in the latter copending application is effectively connected in shunt with one of the windings of a transformer since the voltage drop across said capacitance is substantially independent of the load current flowing in the transformer.

A second method of compensating for or reducing the effective impedance of a transformer employed in a distribution system to thereby improve the voltage regulation and the efficiency of the distribution system is disclosed in copending application, Serial No. 786,468, now abandoned, filed January 13, 1959, by Herbert W. Book and assigned to the same assignee as the present application. The latter copending application discloses a winding construction which provides a predetermined capacitance between the adjacent turns of the different windings of a transformer similarly to the construction disclosed in my copending application previously mentioned. The capacitance, however, provided by the construction disclosed in copending application Serial No. 786,468 is effectively connected in series with one of the windings of the transformer and may be employed to substantially cancel or compensate for at least a portion of the voltage drop across the overall impedance of a transformer and for at least a portion of the voltage drop across the impedance of an associated feeder line connected to said transformer in an electrical distribution system to provide a transformer for use in a distribution system which is essentially self-regulating. While the transformer construction just described offers the advantages of greatly improved voltage regulation and efficiency in an electrical distribution system, the transformer construction may be vulnerable in certain applications to damage from overvoltages which result when a fault or abnormal operating condition occurs in a distribution system and abnormally large magnitudes of current tend to flow through such a transformer in a distribution system. It is, therefore, desirable to provide a transformer having all of the advantages of the improved transformer construction disclosed in copending application Serial No. 786,468 and which has the additional advantage of preventing the overvoltages which might otherwise result in a transformer as disclosed in said copending application when a fault or abnormal operating condition occurs in the distribution system connected to the transformer.

It is an object of this invention to provide a new and improved electrical inductive apparatus, such as a transformer.

Another object of this invention is to provide a new and improved transformer which offers a relatively low impedance to the flow of useful load current in an electrical distribution system and which offers a relatively high impedance to the flow of the abnormally large currents resulting when a fault or abnormal operating condition occurs in the distribution system connected to said transformer.

A further object of this invention is to provide a transformer which has a predetermined capacitance between the windings thereof that is effectively connected in series with one of said windings and in which overvoltages are prevented when a fault or abnormal operating condition occurs on the distribution system connected to said transformer.

Other objects of the invention will, in part, be obvious and will, in part, appear hereinafter.

For a fuller understanding of the nature and objects of the invention, reference should be had to the following detailed description, taken in connection with the accompanying drawing, in which:

FIGURE 1 is a front elevational view partly in section and partly schematic of a transformer core and coil assembly constructed in accordance with the teachings of the copending applications previously mentioned;

FIG. 2 is an equivalent schematic diagram of circuits and apparatus illustrating a first embodiment of this invention and including a transformer core and coil assembly as shown in FIG. 1;

FIG. 3 is an equivalent schematic diagram of circuits and apparatus illustrating a second embodiment of this invention and also including a transformer core and coil assembly as shown in FIG. 1; and FIG. 4 is an equivalent schematic diagram of circuits and apparatus illustrating another embodiment of the invention.

Referring now to the drawing and FIG. 1 in particular, there is illustrated a transformer core and coil assembly 10 which is constructed in accordance with the teachings of the copending applications previously mentioned to provide a predetermined capacitance between the different windings thereof. The transformer core and coil assembly 10 includes a first winding 20 and second winding 30 which are both inductively disposed on a magnetic core structure 50. The magnetic core structure 50 includes two windows which are formed by the first and second outer leg members 62 and 66, respectively, and a middle or winding leg member 64 on which the first and second windings 20 and 30, respectively, are inductively disposed. The winding leg member 64 is enclosed or surrounded by a supporting member, more specifically a tube or barrier 28, on which the first and second windings 20 and 30, respectively, are wound and which may also serve to insulate said windings from said winding leg member.

As described in greater detail in the copending applications previously mentioned, the first or primary winding 20 comprises a plurality of turns of a first layer of conducting sheet or strip material 24 and a second layer of insulating sheet or strip material 26 which are generally spirally wound together about a portion of the magnetic core 50, specifically the winding leg member 64 in this particular case. The width of the insulating sheet or film material 26 is preferably greater than the width of the layer of conducting sheet or foil material 24 in order to provide additional creep insulation between the adjacent turns of the first winding 20. The conducting material 24 and the insulating material 26 are both of a general type in which the axial dimension of the material is relatively large compared to the radial dimension. Each turn of the first winding 20 as indicated at P, includes only a layer of the insulating material 26 and a layer of the conducting material 24.

Similarly to the first winding 20, the second winding 30 also includes a plurality of turns of a layer of conducting sheet or strip material 34 and two layers of insulating sheet or strip material 36 which are disposed on opposite sides of the conducting sheet or foil material 34. In particular, each turn of the second winding 30, as indicated at S, includes two layers of the insulating sheet or film material 36 and a layer of conducting sheet or foil material 34 disposed therebetween, as best shown in FIG. 1. In general, the turns of the second winding 30 are wound simultaneously with and continuously interleaved with at least a portion of the turns of the first winding 20 as shown in FIG. 1.

In winding the primary winding 20, the first portion including a plurality of turns is wound as indicated at A. After the first portion A of the primary winding 20 has been wound, including a predetermined plurality of turns, the winding of the second winding 30 is started. After the first portion A of the primary winding 20 has been wound, the three layers of material which comprise the secondary winding 30 are added to the two layers of material which comprise the primary winding 20 and the five layers of material are then wound simultaneously with the turns of the secondary winding 30 being continuously interleaved with the adjacent turns of the primary winding 20 as previously mentioned. In the portion of the primary winding 20 in which the turns of the secondary winding 30 are wound simultaneously, each turn of the combined primary and secondary windings as indicated at PS includes a layer of the insulating material 26 and a layer of the conducting material 24 which comprise the primary winding 20 and two layers of the insulating material 36 and the layer of conducting material 34 which comprise the secondary winding 30. The latter portion of the combined first and second windings 20 and 30, respectively, is indicated at B in FIG. 1. After the combined turns of the primary winding 20 and the secondary winding 30 have been wound, the final portion of the primary winding 20 is then wound with a plurality of turns, each of which includes only the layer of insulating sheet material 26 and the layer of conducting sheet material 24. The turns of the secondary winding 30, therefore, start and stop at first and second predetermined turns of the primary winding 20.

Considering the connections of the first and second windings 20 and 30, respectively, as shown in FIG. 1, the inner end or turn of the conducting sheet material 24 of the first winding 20 is electrically connected to the terminal 101. The outer end or turn of the layer of conducting sheet material 24 of the first winding 20 is electrically connected to the terminal 102. The inner end or turn of the layer of conducting sheet material 34 of the second winding 30 is electrically connected to the terminal 14. The outer end or turn of the layer of conducting sheet material 34 is electrically connected to the terminal 12. The inner end or turn of the second winding 30 at the terminal 14 is also electrically connected to the terminal 104 and may be additionally connected to the ground connection, as indicated at 32. It is to be understood that in certain applications, the terminal 104 may be connected to some other point of the second winding 30, such as the midpoint.

As described in greater detail in the copending applications previously mentioned, the manner in which the first winding 20 and the second winding 30 are constructed or arranged with the adjacent turns of the respective windings being continuously interleaved has several important results. Referring to FIG. 2, there is illustrated an equivalent schematic diagram which includes a schematic representation of the first and second windings 20 and 30, respectively, of the transformer core and coil assembly 10 shown in FIG. 1. Because of the insulating and conducting materials employed and because of the manner in which the turns of the first and second windings 20 and 30, respectively, are wound as previously described, a predetermined capacitance, as indicated at 72, results between the adjacent turns of the first and second windings 20 and 30, respectively, as shown in FIG. 2. In a typical application of the transformer core and coil assembly 10, as explained in greater detail in copending application Serial No. 786,468 previously mentioned, if the terminals 102 and 104 are connected to an external alternating current circuit or source of alternating current 100 through the primary power circuit conductors P1 and P2, respectively, as shown in FIG. 2, but with the terminal 101 of the primary winding 20 left unconnected to an external alternating current circuit or source and the terminals 12 and 14 of the secondary winding 30 are connected to a second alternating current circuit or load circuit, including the load 18, through the secondary power circuit conductors S1 and S2, respectively, then the inherent distributed capacitance is effectively connected in series with the primary winding 20. As previously mentioned, the transformer core and coil assembly 10 might then be vulnerable in certain applications to damage from the overvoltages which result from the abnormally large currents which tend to flow when a fault or abnormal operating condition occurs in the load circuit which includes the load 18.

In order to prevent the overvoltages which might otherwise develop when a fault condition occurs in the load circuit, which includes the load 18, and the consequent damage to the transformer core and coil assembly 10 therefrom, the switching means 80 is connected in circuit relation with the transformer core and coil assembly between the inner terminal 101 of the primary winding 20 and the terminal 104 which is connected to both the power circuit conductor P2 which is connected to the source of alternating current 100 and also to the inner terminal 14 of the secondary winding 30. In general, the switching means 80 is responsive to the voltage applied across said switching means between the terminal 101 at the inner end of the primary winding 20 and the terminal 104 and when the voltage across the switching means 80 increases to or reaches substantially a predetermined value, the switching means 80 effectively closes to provide a low impedance connection between the terminal 101 and the terminal 104 to thereby operatively connect the previously unconnected terminal 101 of the primary winding 20 to the terminal 104 and, in turn, to the source 100 and also to the inner terminal 14 of the secondary winding 30. The connection of the inherent distributed capacitance 72 is, therefore, changed from a normal connection which is effectively or operatively in series with the primary winding 20 to a connection which is effectively or operatively in parallel or shunt with said primary winding as disclosed in my copending application Serial No. 745,555 previously mentioned. In normal operation, therefore, the voltage across the capacitance 72 varies with the load current flowing through the transformer core and coil assembly 10 while after the switching means 80 has operated in response to an overvoltage condition existing between the terminal 101 and the terminal 104, the voltage across the capacitance 72 is substantially independent of the load current flowing through the transformer 10 to thereby assist in limiting the overvoltage which might otherwise result in the transformer core and coil assembly 10 and the consequent damage to said core and coil assembly therefrom. When the fault or abnormal operating condition ends in the load circuit which includes the load 18, and the voltage across the switching means 80 decreases below substantially the predetermined value, the switching means 80 reverts to its normal condition to thereby insert a relatively high impedance between the terminals 101 and 104 and effectively open the connection between the terminals 101 and 104 so that the terminal 101 is no longer operatively connected to the terminal 104. The capacitance 72 is then restored to effectively a series connection with the associated primary winding 20, as previously described.

In particular, the switching means 80 comprises the first and second semiconductor diodes 82 and 84 which are connected in series circuit relation with one another and reversely poled with respect to each other, the series circuit being connected between the inner terminal 101 of the primary winding 20 and the terminal 104, as shown in FIG. 2. The semiconductor diodes 82 and 84 are preferably of the type known to the art as Zener diodes, having associated therewith a critical reverse breakdown voltage and a relatively low impedance for applied voltages in excess of said critical breakdown voltage. The diodes 82 and 84 are reversely poled with respect to each other so that for voltages applied between the terminals 101 and 104 above substantially a predetermined value, and of either polarity, the impedance of the switching means 80 will decrease to a relatively low value and operatively connect the terminals 101 and 104 as previously described to limit the voltages which result from a fault condition in the load circuit which includes the load 18 to a relatively safe value and prevent damage to the core and coil assembly 10.

It is to be understood that other types of semiconductive switching devices, such as those of the two terminal and three terminal types listed in the Electronics Magazine issues of February 27 and March 6, 1959 on pages 62 and 63 and 50 and 51, respectively, may be substituted for the semiconductor diodes 82 and 84 shown in FIG. 2 with appropriate changes in the circuit connections where required.

Referring now to FIG. 3, there is illustrated a circuit arrangement similar to the circuit shown in FIG. 2 except that switching means 90, which is responsive to the current in one of the windings of the transformer core and coil assembly 10, is employed rather than the switching means 80 which is responsive to the voltage conditions in the transformer core and coil assembly 10. In general, the circuit connections of the circuit shown in FIG. 3 are similar to the circuit connections of the circuit shown in FIG. 2.

In particular, the switching means 90 includes a current transformer winding 92 which is disposed in inductive relationship with the lead from the secondary winding 30 to the terminal 14 and is, therefore, responsive to the current which flows in said secondary winding and to the current which flows in the load circuit, which includes the load 18, and the secondary power circuit conductors S1 and S2. The switching means 90 also includes a conventional current responsive relay having an operating winding 94 connected across the output of the current transformer winding 92 and a normally open contact 96 which is connected in series circuit relationship with the primary winding 20 between the terminal 101 and the terminal 104. When a fault or abnormal operating condition occurs in the load circuit which includes the load 18, the current relay 80 is actuated to change the position of the normally open contact 96 to a closed postion to thereby complete the circuit between the terminal 101 of the primary winding 20 and the terminal 104. The latter operation of the current relay 80 occurs when the current through the secondary winding 30 and the load circuit which includes the load 18 increases to or reaches substantially a predetermined value. When the fault or abnormal operating condition is terminated or ends in the load circuit which includes the load 18, the normally open contact 96 reverts to its normally open position to thereby operatively disconnect or open the connection between the terminal 101 of the primary winding 20 and the terminal 104, similarly to the operation of the switching means 80 shown in FIG. 2. It is clear that other types of known control means, such as those of the static type, which includes magnetic devices and semiconductor devices, could be substituted for the conventional mechanical type current relay 80 shown in FIG. 3 to respond to the current flowing in one of the other of the windings of the core and coil assembly 10 to thereby actuate a switching means, such as a circuit breaker, between the terminal 101 of the primary winding 20 and the terminal 104 which is connected to the source 100 and the inner terminal 14 of the secondary winding 30. The operation of the switching means 90 is similar to that of the switching means 80 shown in FIG. 2 since the switching means 90 prevents damage to the core and coil assembly 10 when a fault occurs in the load circuit which includes the load 18 by changing the connection of the inherent distributed capacitance 72 from effectively a normal series connection with the primary winding 20 to a connection which is effectively in shunt or parallel with said primary winding, as previously discussed in connection with the switching means 80.

In addition to providing a switching means, such as the switching means 80 or the switching means 90, in association with the windings of the core and coil assembly 10, the fault current which might otherwise flow in the windings of said core and coil assembly may be additionally reduced or limited by providing the transformer core and coil assembly 10 with a relatively high leakage reactance which may be obtained by physically separating or displacing the electrical centers of the first and second windings 20 and 30, respectively, from one another or by increasing the number of turns in each of said windings while maintaining substantially the desired ratio of turns between said first and second windings. The former method of obtaining a high leakage reactance may be accomplished in the present transformer construction by shifting the turns of the second winding 30 either toward the inner turns or towards the outer turns of the associated first or primary winding 20 in a particular application. The high leakage reactance which is thereby obtained then assists the operation of or cooperates with the switching means, which is responsive to either the voltage or the current in the transformer core and coil assembly 10, to limit the fault currents which flow in said core and coil assembly and the corresponding overvoltages which might otherwise result therefrom.

Referring to FIG. 4, the distributed capacitance 72 between the primary winding 20 and the secondary winding 30 may be increased by extending the primary winding 20 as indicated at 110 and extending the secondary winding 30 as indicated at 112 and 113. Substantial increase in the distributed capacitance 72 may be obtained in this manner without significant increase in complication and expense of construction of the transformer. The transformer 10 is illustrated in FIG. 4 using a voltage responsive switching device 80, such as illustrated in FIG.

2, but a current responsive switching device, such as device 90 shown in FIG. 3, could also be used. In all respects, except for the increased distributed capacitance 72, the transformer illustrated in FIG. 4 is identical to to the transformers illustrated in FIGS. 2 and 3.

In summary, the transformer core and coil assembly with the associated apparatus as disclosed offers the advantages of greatly improved voltage regulation and efficiency in an electrical distribution system employing the transformer construction disclosed in copending application Serial No. 786,468 previously mentioned during normal operating conditions, in the absence of a fault or abnormal operating condition in the distribution system to which the transformer is connected. When a fault or abnormal condition occurs in the distribution system to which a transformer as disclosed is connected, the switching means as disclosed, in cooperation with the high leakage reactance of a transformer as disclosed, prevents damage which might otherwise result to the transformer by limiting the fault currents which might otherwise flow in the transformer as well as the corresponding associated overvoltages resulting from said fault current.

It is to be understood that in certain applications, as disclosed in the copending applications previously mentioned, that the conducting sheet or strip material which makes up each of the first and second windings 20 and 30, repectively, of the transformer core and coil assembly 10 may be coated with an insulating material on at least one side thereof to eliminate the requirement for separate layers of insulating material disposed between the adjacent turns of each of said windings. The construction of the core and coil assembly 10 may also be modified in accordance with other teachings of the copending applications previously mentioned.

The circuits and apparatus embodying the teachings of this invention have several advantages. For example, a transformer with the associated apparatus as disclosed offers a relatively low impedance to the flow of useful load current in an electrical distribution system and thereby improves the voltage regulation of said distribution system as well as increases the efficiency and the useful current-carrying ability of said distribution system. In addition, when a fault or abnormal operating condition occurs in the distribution system to which the transformer is connected, the transformer presents a relatively high impedance to the flow of the abnormally high currents which might otherwise result and prevents damage to the transformer which might otherwise result due to the consequent overvoltages in said transformer. Finally, the transformer construction as disclosed has all of the advantages of the transformer construction disclosed in the copending applications previously mentioned with respect to the reduction of exciting current and the associated losses, with respect to improved mechanical strength and improved space factor, and with respect to the greatly improved voltage regulation which varies in accordance with the load current being carried by the transformer.

Since numerous changes may be made in the above-described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. A transformer for connection to an alternating current circuit having two power conductors, comprising a magnetic core, a first widing comprising a plurality of turns of a layer of conducting foil material and a layer of insulating sheet material wound together, a second winding comprising a plurality of turns of a layer of conducting foil material and a layer of insulating sheet material, the turns of said second winding being wound together with and continuously interleaved with a portion of the turns of said first winding on said core to provide a predetermined series capacitance between the adjacent turns of said first and second windings, one turn of each of said windings adapted to be separately connected to one of the power conductors of said circuit, and normally open switching means responsive to a predetermined condition of said transformer for connecting one point of each of said windings together to a common point to change the capacitance to a shunt capacitance.

2. A transformer for connection to an alternating current circuit having two power conductors, comprising a magnetic core, a first winding comprising a plurality of turns of a layer of conducting sheet material and a layer of insulating sheet material wound together, a second winding comprising a plurality of turns of a layer of conducting sheet material and a layer of insulating sheet material, the turns of said second winding being wound together with and continuously interleaved with a portion of the turns of said first winding on said core to provide a predetermined capacitance between the adjacent turns of said first and second windings, one turn of each of said windings being adapted to be separately connected to one of the power conductors of said circuit, and semiconductive switching means responsive to a predetermined condition of said transformer to become conductive and connect one point of each of said windings together to a common point to change the capacitance from a series to a shunt capacitance.

3. A transformer for connection to an alternating current circuit having two power conductors, comprising a magnetic core, a first winding comprising a plurality of turns of a layer of conducting foil material and a layer of insulating sheet material wound together, a second winding comprising a plurality of turns of a layer of conducting foil material and a layer of insulating sheet material, the turns of said second winding being wound together with and continuously interleaved with a portion of the turns of said first winding on said core to provide a predetermined series capacitance between the adjacent turns of said first and second windings, one end turn of each of said windings being adapted to be separately connected to one of the power conductors of said circuit, and normally open switching means responsive to a predetermined condition of said transformer for connecting the unconnected end turn of the first winding to the same power conductor as the second winding to change the capacitance to a shunt capacitance.

4. A transformer for connection to a source of alternating current, comprising a magnetic core, a first winding including a plurality of turns of a layer of conducting sheet material and a layer of insulating sheet material spirally wound together on said core, a second winding including a plurality of turns of a layer of conducting sheet material and a layer of insulating sheet material, the turns of said second winding being wound with and continously interleaved with a portion of the turns of said first winding to provide a predetermined capacitance between the adjacent turns of the respective windings, one end of each of said first and second windings being adapted to be connected to opposite sides of said source, and normally open means responsive to a predetermined condition of said transformer for effectively connecting the unconnected end of said first winding to one end of said second winding to change the capacitance from a series to a shunt capacitance.

5. A transformer for connection to a source of alternating current, comprising a magnetic core, a first winding including a plurality of turns of a layer of conducting sheet material and a layer of insulating sheet material spirally wound together on said core, a second winding including a plurality of turns of a layer of conducting sheet material and a layer of insulating sheet material, the turns of said second winding being wound with and continuously interleaved with a portion of the turns of said first winding to provide a predtermined series capacitance between the adjacent turns of the respective windings, first ends of each of said first and second windings being adapted to be connected to opposite sides of said source, and semiconductive switching means responsive to a predetermined condition of said transformer to become conductive and connect a second end of said first winding to one end of said second winding to change the capacitance to a shunt capacitance.

6. A transformer for connection between first and second alternating current circuits, comprising a magnetic core, a first winding disposed on said core comprising a plurality of turns of conducting strip material having a coating of insulation on at least one side thereof, a second winding disposed on said core comprising a plurality of turns of conducting strip material having a coating of insulation on at least one side thereof, the turns of said second winding being wound with and continuously interleaved with the turns of said first winding on said core to provide a predetermined capacitance between the adjacent turns of said first and second windings, one turn of said first winding being adapted to be directly connected to one side of said first alternating current circuit, said second winding being adapted to be connected across said second circuit and having one point connected to the other side of said first circuit, and normally open switching means responsive to a condition of said transformer for operatively connecting another turn of said first winding to said other side of said first circuit to change the capacitance from a series capacitance to a shunt capacitance.

7. A transformer for connection between first and second alternating current circuits, comprising a magnetic core, a first winding comprising a plurality of turns of a layer of conducting strip material and a layer of insulating material wound together therewith, a second winding comprising a plurality of turns of a layer of conducting strip material and a layer of insulating material wound together therewith, the turns of said second winding being wound with and continuously interleaved with the turns of said first winding on said core to provide an effectively series between the adjacent turns of said first and second windings, one turn of said first winding being adapted to be directly connected to one side of said first alternating current circuit, said second winding being adapted to be connected across said second circuit and have one point connected to the other side of said first circuit, and normally opens switching means responsive to a condition of said transformer for operatively connecting another point on said first winding to said other side of said first circuit to change the capacitance to an effectively shunt capacitance.

8. A transformer for connection between first and second alternating current circuits, comprising a magnetic core, a first winding comprising a plurality of turns of conducting strip material having a coating of insulation on at least one side thereof, a second winding comprising a plurality of turns of conducting strip material having a coating of insulation on at least one side thereof, the turns of said second winding being wound with and continuously interleaved with the turns of said first winding on said core to provide an effectively series capacitance between the adjacent turns of said first and second windings, one end of said first winding being adapted to be directly connected to one side of said first alternating current circuit, said second winding being adapted to be connected across said second circuit and having one point connected to the other side of said first circuit, and normally open relay means responsive to a predetermined current flow in one of said alternating current circuits for operatively connecting the other end of said first winding to said other side of said first circuit to change the capacitance to an effectively shunt capacitance.

9. A transformer for connection between first and second alternating current circuits, comprising a magnetic core, a first winding comprsing a plurality of turns of conducting strip material having a coating of insulation on at least one side thereof, a second winding comprising a plurality of turns of conducting strip material having a coating of insulation on at least one side thereof, the turns of said second winding being wound with and continuously interleaved with the turns of said first winding on said core to provide an effectively series capacitance between the adjacent turns of said first and second windings, one end of said first winding being adapted to be directly connected to one side of said first alternating current circuit, said second winding being adapted to be connected across said second circuit and have one end connected to the other side of said first circuit, and semiconductive switching means responsive to a condition of said transformer to become conductive for operatively connecting the other end of said first winding to said other side of said first circuit to change the capacitance to an effectively shunt capacitance.

10. A transformer for connection between first and second alternating current circuits, comprising a magnetic core, a first winding comprising a plurality of turns of a layer of conducting strip material and a layer of insulating material wound together therewith, a second winding comprising a plurality of turns of a layer of conducting strip material and a layer of insulating material wound together therewith, the turns of said second winding being wound with and continuously interleaved with the turns of said first winding on said core to provide a predetermined capacitance between the adjacent turns of said first and second windings, one end of said first winding being adapted to be directly connected to one side of said first alternating current circuit, said second winding adapted to be connected across said second circuit and have one point connected to the other side of said first circuit, and semiconductive switching means responsive to a condition of said transformer to become conductive for operatively connecting the other end of said first winding to said other side of said first circuit to change the effect of the capacitance from a series to a shunt capacitance.

11. In a transformer for connection between first and second alternating current circuits, a first winding comprising a plurality of turns of conducting strip material having insulation on at least one side thereof, a second winding comprising a plurality of turns of conducting strip material having insulation on at least one side thereof, the turns of said second winding being wound with and continuously interleaved with the turns of said first winding to provide a predetermined capacitance between the adjacent turns of said first and second windings, one point on said first winding being adapted to be connected to a first point on said first alternating current circuit, said second winding being adapted to be connected to said second circuit, means for connecting one point on said second circuit to a second point on said first circuit, and normally open switching means responsive to a predetermined current flow in one of said alternating current circuits for operatively connecting another point on said first winding to said first circuit to change the effect of the capacitance from a series to a shunt capacitance.

12. In a transformer for connection between first and second alternating current circuits, a first winding comprising a plurality of turns of conducting strip material having insulation on at least one side thereof, a second winding comprising a plurality of turns of conducting strip material having insulation on at least one side thereof, the turns of said second winding being wound with and continuously interleaved with the turns of said first winding to provide an effectively series capacitance between the adjacent turns of said first and second windings, one point on said first winding being adapted to be connected to a first point on said first alternating current circuit, said second winding being adapted to be connected to said second circuit, means for connecting one point on said second circuit to a second point on said first circuit, and normally non-conductive semiconductor switching means responsive to a predetermined current flow in in one of said alternating current circuits to become conductive for operatively connecting another point on said first winding to said first circuit to change the capacitance to an effective shunt capacitance.

13. In combination, a transformer having a plurality of windings, said windings having turns formed of electrically conductive strip material, at least a portion of the turns of at least two of said windings being interleaved to provide a predetermined capacitance, a protective device connected between said interleaved windings for changing the circuit effect of said capacitance when said protective device is conductive, said protective device being responsive to predetermined conditions of the transformer to change from a non-conductive state to a conductive state.

14. In combination, a transformer having a plurality of windings, said windings having turns formed of electrically conductive strip material, at least a portion of the turns of at least two of said windings being interleaved and electrically insulated to provide a predetermined capacitance, said windings being connected to arrange said capacitance effectively in series with certain of said windings, a protective device connected in circuit relation with said interleaved windings, said protective device being responsive to predetermined electrical conditions to change said capacitance from effective series circuit relationship to effective shunt circuit relationship with certain of said windings.

15. Electrical inductive apparatus comprising at least two windings having turns thereof continuously interleaved to provide a capacitance between the windings, a static protective device connected across the capacitance, said device being non-conductive during a predetermined loading on the apparatus, said device becoming conductive during predetermined electrical conditions to establish a shunt circuit for the capacitance.

16. Electrical inductive apparatus comprising at least two windings having turns thereof continuously interleaved to provide a capacitance between the windings, a static protective device connected across the capacitance, said protective device having a high resistance during predetermined electrical conditions, said protective device being responsive to other predetermined electrical conditions to provide a low resistance shunt path for said capacitance.

17. A transformer comprising, primary and secondary windings having turns formed of electrically conductive sheet material, certain turns of said primary and secondary windings being interleaved to provide a predetermined capacitance, said primary and secondary windings being connected to effectively arrange said capacitance in series circuit relation with said primary winding, and means responsive to a predetermined electrical condition of said transformer to switch said capacitance from a series arrangement to a parallel arrangement relative to said primary winding.

18. A transformer comprising, input and output terminals, primary and secondary windings each formed of a plurality of turns of electrically conductive sheet material wound together in interleaved relation, means for insulating the windings and the turns of each winding, one of said input terminals being connected to the primary winding, the other of said input terminals and said output terminals being connected to the secondary winding to provide a predetermined capacitance effectively connected in series with at least one of said windings, and means responsive to a predetermined condition of said transformer to connect the other of said input terminals to the primary winding and thereby effectively change the capacitance to a shunt connected arrangement.

References Cited by the Examiner

UNITED STATES PATENTS

| 2,521,513 | 9/50 | Gray | 336—165 X |
| 2,577,707 | 12/51 | Kerns et al. | 336—206 X |
| 2,863,130 | 12/58 | Gray et al. | 336—180 X |
| 2,959,726 | 11/60 | Jensen | 323—43.5 X |
| 2,984,780 | 5/61 | Koletsky | 323—99 X |
| 3,040,239 | 6/62 | Walker | 323—43.5 X |
| 3,078,411 | 2/63 | Book | 336—150 X |

LLOYD McCOLLUM, *Primary Examiner.*